US010125939B2

(12) United States Patent
Asghari et al.

(10) Patent No.: US 10,125,939 B2
(45) Date of Patent: Nov. 13, 2018

(54) LIGHT BULB RETAINING DEVICE FOR A VEHICULAR LAMP REFLECTOR UNIT

(71) Applicant: DAF Trucks N.V., Eindhoven (NL)

(72) Inventors: Kurosch Hossein Asghari, Eindhoven (NL); Henricus Johannes Leijssen, Eindhoven (NL)

(73) Assignee: DAF Trucks N.V., Eindhoven (NL)

( * ) Notice: Subject to any disclaimer, the term of this patent is extended or adjusted under 35 U.S.C. 154(b) by 75 days.

(21) Appl. No.: 15/528,240

(22) PCT Filed: Nov. 20, 2015

(86) PCT No.: PCT/NL2015/050813
§ 371 (c)(1),
(2) Date: May 19, 2017

(87) PCT Pub. No.: WO2016/080836
PCT Pub. Date: May 26, 2016

(65) Prior Publication Data
US 2017/0343178 A1      Nov. 30, 2017

(30) Foreign Application Priority Data
Nov. 21, 2014   (NL) ..................... 2013853

(51) Int. Cl.
*F21V 19/00* (2006.01)
*F21S 41/39* (2018.01)
(Continued)

(52) U.S. Cl.
CPC ............ *F21S 41/39* (2018.01); *B60Q 1/0064* (2013.01); *B60Q 1/0408* (2013.01);
(Continued)

(58) Field of Classification Search
CPC ........ F21S 41/198; F21S 41/196; F21S 41/19; F21S 41/192; F21V 19/004; F21V 17/162; F21V 17/107; A45C 13/1084; E05C 19/06
(Continued)

(56) References Cited

U.S. PATENT DOCUMENTS

| 247,547 A | * | 9/1881 | Eiseman | ................. B65D 45/24 |
| | | | | 292/113 |
| 1,603,418 A | * | 10/1926 | Scheider | ................. E05C 19/14 |
| | | | | 292/113 |
| 1,791,891 A | * | 2/1931 | Eichner | ................. F21S 41/198 |
| | | | | 292/109 |
| 1,869,026 A | * | 7/1932 | Shaw | .................... F21V 17/162 |
| | | | | 362/441 |

(Continued)

FOREIGN PATENT DOCUMENTS

| DE | 3910191 C1 | 7/1990 |
| FR | 2907192 A1 | 4/2008 |
| JP | S5831601 U | 3/1983 |

OTHER PUBLICATIONS

Mar. 3, 2016—International Search Report and Written Opinion of PCT/NL2015/050813.

*Primary Examiner* — Ismael Negron
(74) *Attorney, Agent, or Firm* — Banner & Witcoff, Ltd.

(57) ABSTRACT

A vehicular light bulb locking device includes a resilient retainer clip with a clamp portion for connecting to a lamp reflector unit, a substantially cylindrical portion, and a beveled lip formed at a free end of the clamp portion; and a bracket body for engaging a light bulb in the lamp reflector unit, the bracket body having a hinge pin pivotally received in the cylindrical portion of the retainer clip, and at least one click finger. The bracket body is pivotable between an open position enabling a light bulb to be replaced, and a locked position in which the at least one click finger engages the beveled lip, and a light bulb is firmly held with respect to the lamp reflector unit.

14 Claims, 5 Drawing Sheets

(51) Int. Cl.
*F21S 41/19* (2018.01)
*F21S 41/162* (2018.01)
*F21S 43/37* (2018.01)
*F21S 43/00* (2018.01)
*B60Q 1/00* (2006.01)
*B60Q 1/04* (2006.01)
*F21V 19/04* (2006.01)
*F21W 102/00* (2018.01)
*B60Q 1/30* (2006.01)

(52) U.S. Cl.
CPC ............ *F21S 41/162* (2018.01); *F21S 41/19* (2018.01); *F21S 43/00* (2018.01); *F21S 43/37* (2018.01); *F21V 19/04* (2013.01); *B60Q 1/30* (2013.01); *F21W 2102/00* (2018.01)

(58) Field of Classification Search
USPC .................................................. 292/113, 257
See application file for complete search history.

(56) References Cited

U.S. PATENT DOCUMENTS

| | | | | |
|---|---|---|---|---|
| 2,704,218 | A * | 3/1955 | Claud-Mantle | E05C 19/14 292/113 |
| 2,743,029 | A * | 4/1956 | Mautner | B65D 7/12 292/113 |
| 3,193,314 | A * | 7/1965 | Johnson | E05C 19/14 292/113 |
| 3,847,423 | A * | 11/1974 | Gley | E05C 19/14 292/113 |
| 4,049,301 | A * | 9/1977 | Schenk | A44B 11/125 292/113 |
| 4,811,178 | A * | 3/1989 | Ernst | F21S 41/196 362/548 |
| 4,933,819 | A * | 6/1990 | Mohsakowski | F21S 41/196 362/519 |
| 5,257,839 | A * | 11/1993 | Nielsen | E05C 19/14 292/113 |
| 5,271,649 | A * | 12/1993 | Gromotka | E05C 19/14 292/113 |

* cited by examiner

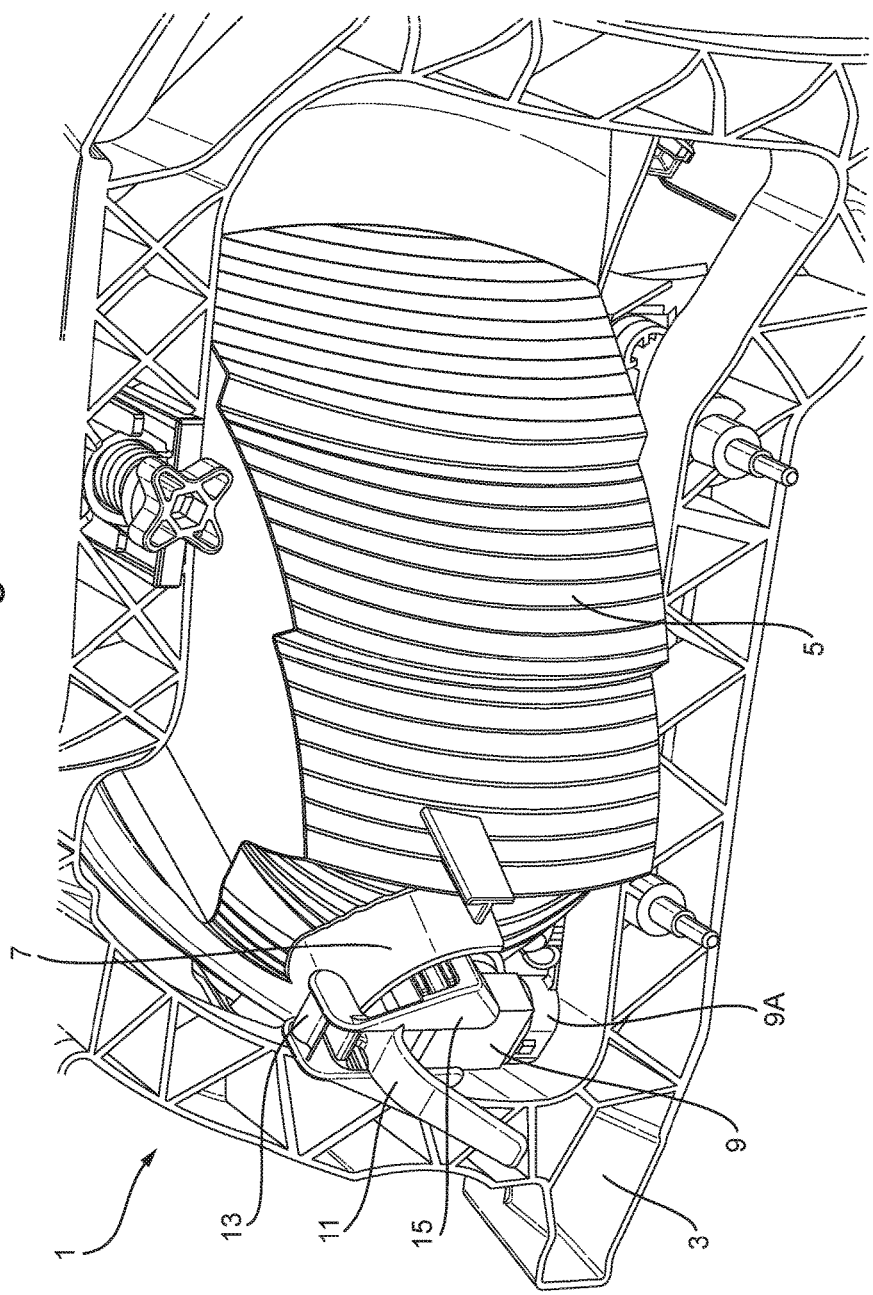

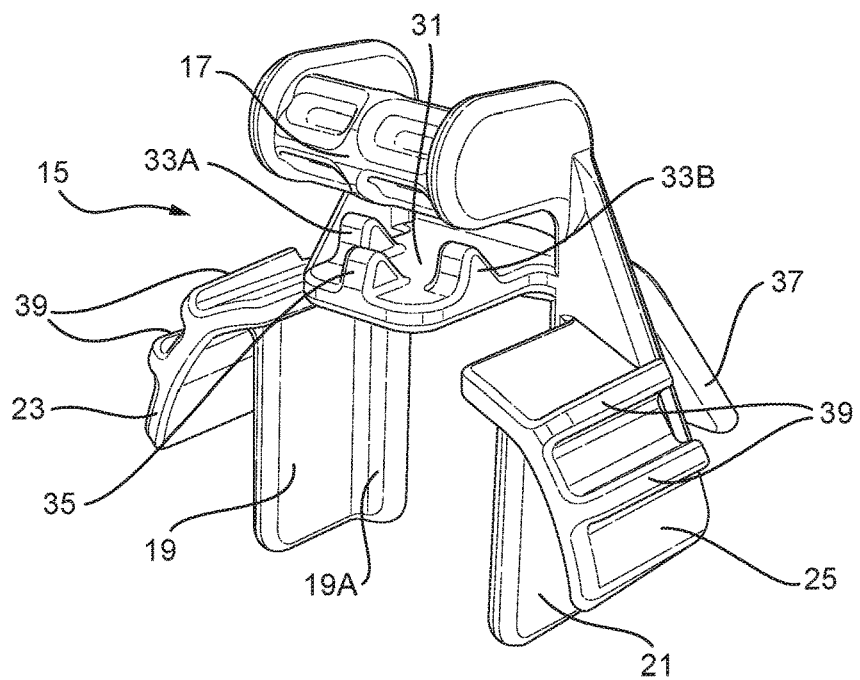
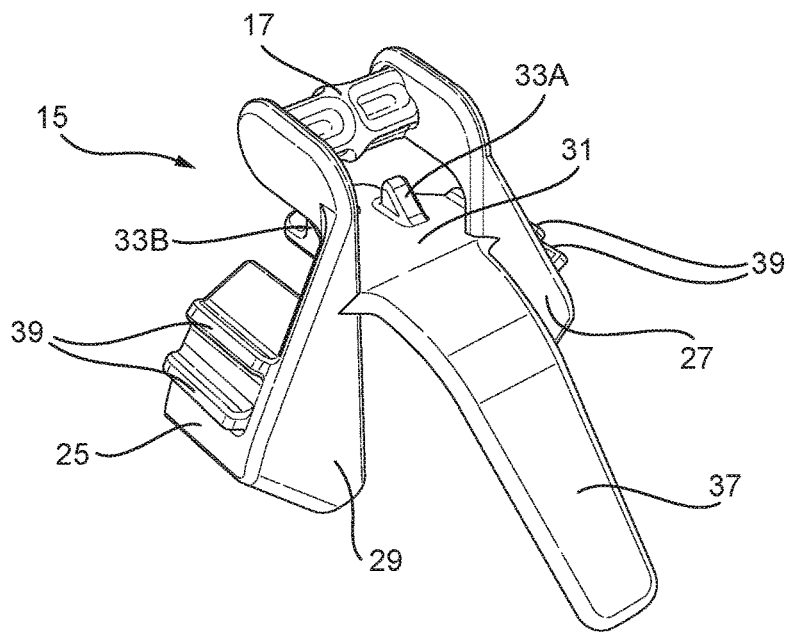

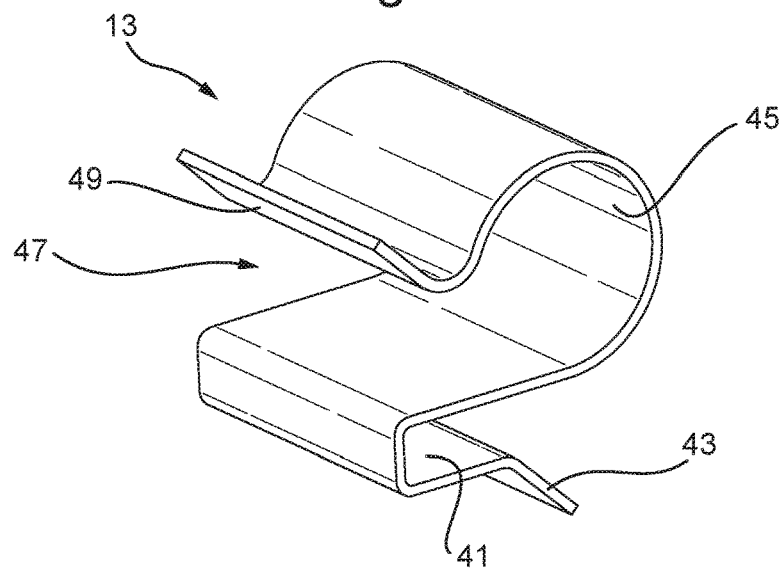
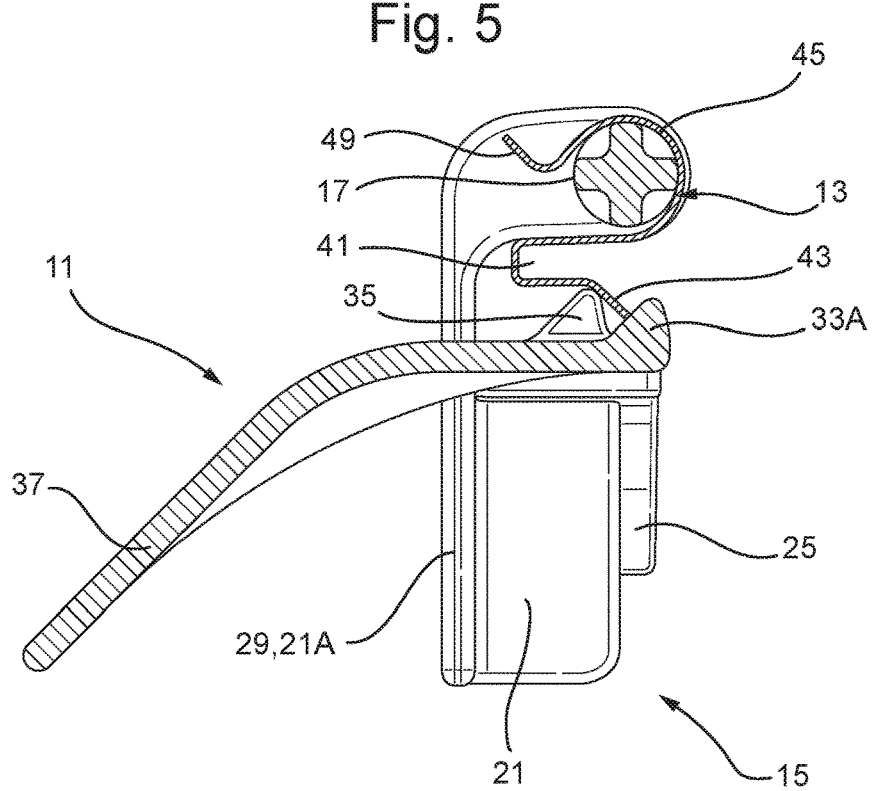

LIGHT BULB RETAINING DEVICE FOR A VEHICULAR LAMP REFLECTOR UNIT

CROSS-REFERENCE TO RELATED APPLICATIONS

This application is a U.S. National Stage application under 35 U.S.C. § 371 of International Application PCT/NL2015/050813 (published as WO 2016/080836 A1), filed Nov. 20, 2015, which claims the benefit of priority to NL 2013853, filed Nov. 21, 2014. Benefit of the filing date of each of these prior applications is hereby claimed. Each of these prior applications is hereby incorporated by reference in its entirety.

The present invention relates to a light bulb retaining device for a lamp reflector unit, and more in particular for a vehicular lamp reflector. The invention also relates to a vehicular lamp reflector unit including the light bulb retaining device.

It is common for replaceable light bulbs to be provided with a collar, which is adapted to be received in a mounting aperture of a lamp reflector unit. In particular when the replaceable light bulb is of halogen type the collar includes a bayonet flange with radially projecting ears at circumferentially spaced positions. The radially projecting ears are receivable in corresponding perimeter recesses of the mounting aperture in the lamp reflector unit, and rotation of the bayonet flange subsequently secures the light bulb to the lamp reflector unit.

While this mounting arrangement has been reasonably successful, it has not always been possible to reliably prevent reverse rotation of the light bulb under driving conditions on the road. The resilience and friction upon which these known mounting arrangements have relied have occasionally failed as a result of vibration and wear. Especially the high temperature of such light bulbs, when in use, in combination with an increasing use of plastic components in the vicinity of lamp reflector units have caused fire hazards when light bulbs came loose and fell out of their lamp reflector unit and hit flammable plastic components. There is hence a need for an improved light bulb mounting structure, and preferably an improved light bulb mounting structure that can be retrofitted to existing lamp reflector units.

Accordingly it is an object of the present invention to propose an improved arrangement for locking a light bulb to a lamp reflector unit. In a more general sense it is thus an object of the invention to overcome or reduce at least one of the disadvantages of the prior art. It is also an object of the present invention to provide at least an alternative solution, which is less cumbersome in assembly and operation, and which can moreover be made relatively inexpensively. Alternatively it is an object of the invention to at least provide a useful alternative.

To this end the invention provides a light bulb locking device for mounting on a lamp reflector unit as defined in one or more of the appended claims. Such a light bulb locking device preferably includes: a resilient retainer clip having a clamp portion for connecting to a lamp reflector unit, and a substantially cylindrical portion; and a bracket body for engaging a light bulb received in the lamp reflector unit the bracket body having a hinge pin pivotally embraced by the substantially cylindrical portion of the retainer clip, wherein the bracket body is pivotable between an open position enabling a light bulb to be replaced, when mounted to a lamp reflector unit, and a locked position in which a light bulb is firmly held with respect to a lamp reflector unit to which it is mounted, wherein the clamp portion of the retainer clip has a beveled lip at a free end opposite the substantially cylindrical portion, and wherein the bracket body has at least one click finger for engaging the beveled lip when in the locked position.

Optionally the substantially cylindrical portion of the resilient retainer clip can have a lateral opening. The lateral opening can advantageously be defined between the clamp portion and a beveled free end, to coextend axially of the substantially cylindrical portion.

The bracket body of the light bulb locking device of the invention can optionally also have first and second lateral wall portions. Each of the first and second lateral wall portions can then also be provided with a respective end stop portion extending therefrom in a perpendicular direction.

Light bulb locking device of the invention can also have its bracket body provided with a central platform from which the at least one click finger extends. Then it can be further advantageous when a pair of click fingers extends from this central platform. Optionally a support protrusion can also extend from the central platform.

According to another optional aspect of the invention the bracket body may have first and second arcuate sections. In this regard a plurality of ribs may additionally extend radially outwardly from each of the first and second arcuate sections.

To generally improve manipulation of the light bulb locking device the bracket body can be provided with a bracket handle.

According to a further aspect of the invention the light bulb locking device can be part of a lamp reflector unit. Such a lamp reflector unit, having a mounting aperture for receiving a replaceable light bulb, can then be provided with the light bulb locking device as outlined above either as an initial component, as an optional accessory, or in retrofit. The lamp reflector may further have a canopy that extends about a top portion of the mounting aperture, and the clamp portion of the resilient retaining clip can then be connected to this canopy. This lamp reflector unit may also advantageously form part of a bumper headlight of a truck, a tractor, or like utility vehicle.

Further advantageous aspects of the invention will become clear from the appended description and in reference to the accompanying drawings, in which:

FIG. 1 is a partial perspective view of a bumper mounted headlight or fog light, including a lamp reflector unit provided with a light bulb locking device according to the invention;

FIG. 2 is a isometric front view of a bracket body of the light bulb locking device of the invention;

FIG. 3 is an isometric rear view of the bracket body of FIG. 2;

FIG. 4 is an isometric view of a retainer clip of the locking device of the invention;

FIG. 5 is an elevation in partial cross section of the locking device of the invention in assembled form, but prior to mounting to a lamp reflector unit of a headlight or fog lamp unit;

Figure 6:
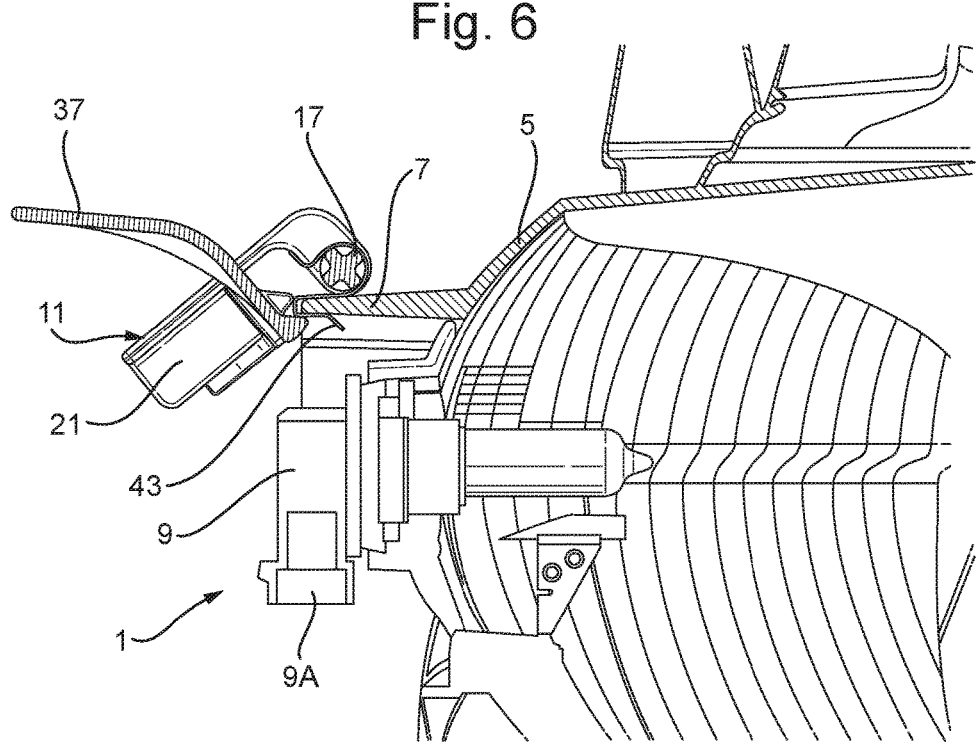
FIG. 6 is a partial longitudinal cross section of a lamp reflector unit, as in FIG. 1, with the locking device of FIG. 5 in an open position.

In FIG. 1 the example is shown of a bumper headlight 1 of a truck. The bumper headlight 1 includes a mounting frame 3 in which a lamp reflector unit 5 has a mounting aperture in an apex of its parabolic reflector (not shown in FIG. 1, but conventional), which is located beneath a canopy 7. The mounting aperture receives a light bulb 9, which is of the general type having an incandescent bulb portion and a 90° angled connector socket portion 9A. Such light bulbs correspond amongst others to the internationally standardised types of H8, H9, H10, H11, H12.HB3, or HB4. Such light bulbs have a collar that is concentrically with respect to the incandescent bulb portion, and the collar includes a bayonet flange. The bayonet flange has radially outwardly extending ears or tabs at circumferentially spaced positions. The mounting aperture in the lamp reflector units 5 has a corresponding formation of circumferentially spaces recesses to receive the ears or tabs of the bayonet flange. These details are conventional and standardised and do not need any further explanation for the skilled person. The light bulb 9 is further seen to be held in position by a locking device 11. The locking device includes a resilient clip 13 and a bracket body 15.

For a description of the bracket body 15, reference will now be made to FIGS. 2 and 3. The bracket body 15 has a hinge pin or pivot shaft 17 at its top, and first and second lateral wall portions 19, 21 at a lower end. Each of the first and second lateral wall portions 19, 21 is terminated by an end step portion, of which only end the stop portion 19A is visible in FIG. 2. The end stop portion 19A extends in a direction perpendicular to the first lateral wall portion 19. A first arcuate section 23 is associated with the first lateral wall portion 19, and a second arcuate section 25 is associated with the second lateral wall portion 21. The first and second arcuate sections 23, 25 are each connected to the relevant first and second lateral wall portions 19, 21 by respective first and second rear wall portion 27, 29. Positioned accurately with respect to the pivot shaft 17 is a central platform 31. Extending upwardly from the central platform 31 is a pair of click fingers 33A, 33B, and a support protrusion 35 for a purpose to be described below. The bracket body 15 is further seen to have a bracket handle 37. The first and second arcuate sections 23, 25 are each provided with radially extending ribs 39.

The resilient retainer clip 13 is shown in more detail in FIG. 4. The retainer clip 13 has a clamp portion 41, which is generally of U-shaped configuration. A lower free end of the clamp portion 41 is shaped as a beveled lip 43. An upper portion of the retainer clip 13 is formed as a substantially cylindrical portion 45, which is laterally open along its axial length. A lateral opening 47 of the substantially cylindrical portion 45 is defined between the clamp portion 41 and a beveled free upper end 49 of the resilient retainer clip 13.

As shown in FIG. 5 the locking device 11 when assembled has the pivot shaft 17 of the bracket body 15 engaged within the substantially cylindrical portion 45 of the resilient retainer clip 13. Furthermore as shown in FIG. 5 the bracket body 15 and the resilient retainer clip 13 can be relatively rotated about the pivot shaft 17 into a position in which the beveled lip 43 becomes engaged behind the pair of click fingers 33A, 33B, and between these click fingers 33A, 33B and the support protrusion 35.

Figure 7:
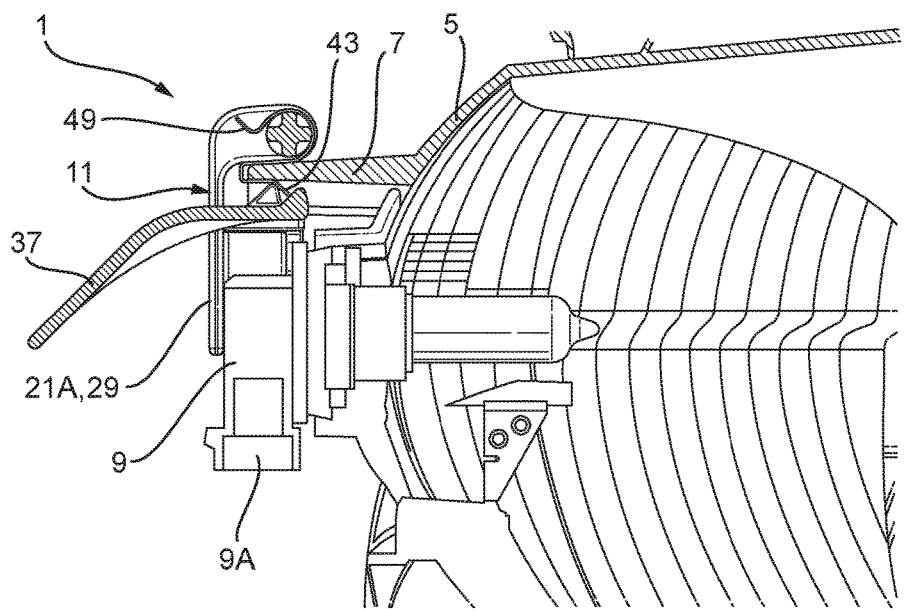
FIG. 7 is a partial longitudinal cross section similar to FIG. 6, but showing the locking device in a closed and locked position.

In use, as explained in reference to FIGS. 6 and 7, the bracket body 15 is pivotable between an open position shown in FIG. 6 and a locked position as shown in FIG. 7 To this end the clamp portion 41 is seen to be clamped onto the canopy 7 which extends from the lamp reflector unit 5. In the open position, as shown in FIG. 6, the locking device 11 enables the light bulb 9 to be replaced. In the closed position, as shown in FIG. 7, the light bulb 9 is firmly held in its connected position to the lamp reflector unit 5. In the locked position of the locking device 11, the socket portion 9A of the light bulb 9 is engaged between the first and second lateral wall portions 19, 21 of the bracket body 15, and thereby cannot become unlocked from its bayonet mount in the lamp reflector unit 5. The closed position of the locking device 11 is ensured by the beveled lip 43 being engaged behind the pair of click fingers 33A.33B, as more clearly shown in FIG. 5. The support protrusion 35 thereby eliminates vibration of the bracket body 15 with respect to the lamp reflector unit 5.

Figure 8:
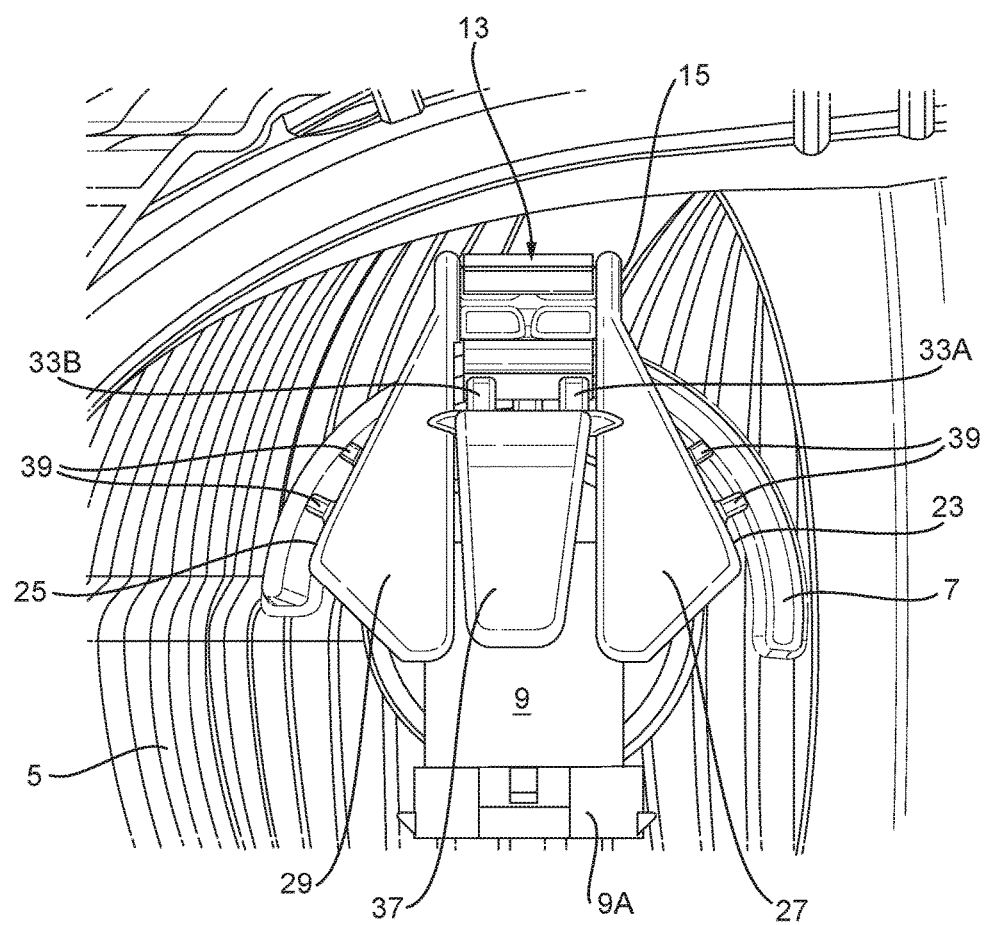
FIG. 8 is a partial rear elevation of the lamp reflector unit of FIGS. 1, 6 and 7, with the locking device in its closed position.

As further shown in FIG. 8, the ribs 39 extending from the first and second arcuate sections 23, 25 on the bracket body 15 on both sides engage the canopy 7 on its inner surface to prevent any deformation of the bracket body 15 when in its locked position. This further prevents the light bulb 9 to become unlocked.

Hence a light bulb locking device 11 is described for mounting to a lamp reflector unit 5 that has a mounting aperture for receiving a replaceable light bulb 9. The locking device 11 includes: a resilient retainer clip 13 with a clamp portion 41 for connecting to a lamp reflector unit 5, and a bracket body 15 for engaging a light bulb 9 in the lamp reflector unit 5. The bracket body 15 having a hinge pin 17 pivotally embraced by a substantially cylindrical portion 45 of the retainer clip 13. The bracket body 15 thereby is pivotable between an open position enabling a light bulb 9 to be replaced, and a locked position in which a light bulb 9 is firmly held with respect to the lamp reflector unit 5. The clamp portion 41 of the retainer clip 13 has a beveled lip 43 at a free end thereof opposite the substantially cylindrical portion 45, and the bracket body 15 has at least one click finger 33A, 33B for engaging the beveled lip 43 when in the locked position.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. Light bulb locking device for mounting on a lamp reflector unit having a mounting aperture for receiving a replaceable light bulb, the locking device includes:
   a resilient retainer clip having a clamp portion for connecting to a lamp reflector unit, and a substantially cylindrical portion; and
   a bracket body for engaging a light bulb received in the lamp reflector unit the bracket body having a hinge pin pivotally embraced by the substantially cylindrical portion of the retainer clip,
   wherein the bracket body is pivotable between an open position enabling a light bulb to be replaced, when mounted to a lamp reflector unit, and a locked position in which a light bulb is firmly held with respect to a lamp reflector unit to which it is mounted,
   wherein the clamp portion of the retainer clip has a beveled lip at a free end opposite the substantially cylindrical portion, and
   wherein the bracket body has at least one click finger for engaging the beveled lip when in the locked position.

2. Light bulb locking device as in claim 1, wherein the bracket body is provided with a handle.

3. Light bulb locking device as in claim 1, wherein the substantially cylindrical portion of the resilient retainer clip has a lateral opening.

4. Light bulb locking device as in claim 3, wherein the lateral opening is defined between the clamp portion and a beveled free end, to coextend axially of the substantially cylindrical portion.

5. Light bulb locking device as in claim 1, wherein the bracket body has first and second lateral wall portions.

6. Light bulb locking device as in claim 5, wherein each of the first and second lateral wall portions has a respective end stop portion extending therefrom in a perpendicular direction.

7. Light bulb locking device as in claim 1, wherein the bracket body has first and second arcuate sections.

8. Light bulb locking device as in claim 7, wherein a plurality of ribs extend radially outwardly from each of the first and second arcuate sections.

9. Light bulb locking device as in claim 1, wherein the bracket body has a central platform from which the at least one click finger extends.

10. Light bulb locking device as in claim 9, wherein a pair of click fingers extends from the central platform.

11. Light bulb locking device as in claim 9, wherein a support protrusion extends from the central platform.

12. Lamp reflector unit provided with the light bulb locking device of claim 1, and having a mounting aperture for receiving a replaceable light bulb.

13. Lamp reflector unit as in claim 12, having a canopy extending about a top portion of the mounting aperture, and wherein the clamp portion of the resilient retaining clip is connected to the canopy.

14. Lamp reflector unit as in claim 12, forming part of a bumper headlight of a truck.

* * * * *